(12) United States Patent
Nagano et al.

(10) Patent No.: US 10,899,336 B2
(45) Date of Patent: Jan. 26, 2021

(54) CONTROL SYSTEM FOR INTERNAL COMBUSTION ENGINE

(71) Applicant: TOYOTA JIDOSHA KABUSHIKI KAISHA, Toyota (JP)

(72) Inventors: Tomoya Nagano, Susono (JP); Koji Miwa, Suntou-gun (JP); Kazuya Suzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 219 days.

(21) Appl. No.: 16/190,593

(22) Filed: Nov. 14, 2018

(65) Prior Publication Data

US 2019/0176800 A1    Jun. 13, 2019

(30) Foreign Application Priority Data

Dec. 8, 2017  (JP) .................................. 2017-236396

(51) Int. Cl.
*B60W 20/10*  (2016.01)
*F02D 41/04*  (2006.01)
(Continued)

(52) U.S. Cl.
CPC .............. *B60W 20/10* (2013.01); *B60K 6/20* (2013.01); *F01N 3/101* (2013.01); *F01N 9/00* (2013.01); *F02B 29/00* (2013.01); *F02D 29/02* (2013.01); *F02D 41/027* (2013.01); *F02D 41/042* (2013.01); *B60W 2710/0616* (2013.01); *B60Y 2200/92* (2013.01); *B60Y 2300/192* (2013.01);
(Continued)

(58) Field of Classification Search
CPC . B60W 20/10; B60K 6/20; F01N 9/00; F01N 3/101; F02D 29/02; F02D 41/027; F02D 41/042; F02B 29/00
USPC ........................................................ 701/22
See application file for complete search history.

(56) References Cited

U.S. PATENT DOCUMENTS

2006/0048734 A1* 3/2006 Kataoka ................ B60W 10/08
                                                  123/179.4
2006/0218894 A1* 10/2006 Miwa ........................ F01N 3/08
                                                  60/277

(Continued)

FOREIGN PATENT DOCUMENTS

JP          2010-007532          1/2010
JP          2015-112964          6/2015

*Primary Examiner* — Yazan A Soofi
(74) *Attorney, Agent, or Firm* — Finnegan, Henderson, Farabow, Garrett & Dunner, LLP

(57) ABSTRACT

In a control system for an internal combustion engine which stops the rotation of an internal combustion engine by applying a counter torque thereto, the generation of noise or vibration accompanying the stop of rotation of the internal combustion engine is suppressed as much as possible. In the control system provided with a controller being adapted to stop the rotation of the internal combustion engine by carrying out forced stop processing in which the counter torque is inputted, in cases where the forced stop processing is carried out after the completion of the execution of specific motoring processing, the controller makes the counter torque at a certain timing before the counter torque becomes a predetermined torque after the start of the execution of the forced stop processing smaller than in the case where the forced stop processing is carried out without carrying out the specific motoring processing.

4 Claims, 9 Drawing Sheets

(51) Int. Cl.
*F02B 29/00* (2006.01)
*B60K 6/20* (2007.10)
*F02D 41/02* (2006.01)
*F01N 9/00* (2006.01)
*F02D 29/02* (2006.01)
*F01N 3/10* (2006.01)

(52) U.S. Cl.
CPC ....... *F01N 2260/04* (2013.01); *F01N 2590/11* (2013.01); *F01N 2900/08* (2013.01); *F02D 2200/0804* (2013.01)

(56) References Cited

U.S. PATENT DOCUMENTS

| | | | |
|---|---|---|---|
| 2010/0004089 A1* | 1/2010 | Iwase | F16H 57/0006 477/3 |
| 2011/0120789 A1* | 5/2011 | Teraya | B60W 20/15 180/65.25 |
| 2015/0158484 A1* | 6/2015 | Sato | B60W 20/40 701/22 |
| 2019/0031178 A1* | 1/2019 | Liu | B60W 10/06 |

* cited by examiner

CONTROL SYSTEM FOR INTERNAL COMBUSTION ENGINE

CROSS-REFERENCE TO RELATED APPLICATIONS

This application claims priority to Japanese Patent Application No. 2017-236396 filed on Dec. 8, 2017, the entire contents of which are incorporated by reference.

BACKGROUND

Technical Field

The present disclosure relates to a control system for an internal combustion engine.

Description of the Related Art

Conventionally, there has been known a technique in which when a predetermined condition is satisfied (e.g., when idling stop is requested, or when an intermittent operation in a hybrid vehicle is requested in which the vehicle is operated by a driving force from a motor in a state where the rotation of a crankshaft of an internal combustion engine is stopped), the rotation of the crankshaft of the internal combustion engine is stopped in an automatic manner.

Then, in patent literature 1, there is disclosed a technique in which in a hybrid vehicle provided with an internal combustion engine and a motor, when the rotation of a crankshaft of the internal combustion engine is caused to stop, the rotation speed of the internal combustion engine is forced to decrease by applying a torque (counter torque) in a direction reverse to the direction of rotation of the internal combustion engine by means of the motor. With this technique, the rotation of the crankshaft of the internal combustion engine is stopped from a state where an idling operation of the internal combustion engine is carried out, by applying the counter torque to the crankshaft by means of the motor.

In addition, in patent literature 2, there is disclosed a technique in which forced motoring is carried out by supplying a driving force from a starter when the ignition of the internal combustion engine is off. With this technique, by carrying out forced motoring, a flow of intake air going to an exhaust pipe from an intake pipe is formed, so that scavenging of an exhaust passage is achieved.

CITATION LIST

Patent Literature

Patent Literature 1: Japanese patent application laid-open publication No. 2015-112964
Patent Literature 2: Japanese patent application laid-open publication No. 2010-007532

SUMMARY

In the hybrid vehicle provided with the motor capable of inputting a torque in the direction of rotation of the internal combustion engine and a torque in the reverse direction thereof to the internal combustion engine, the crankshaft of the internal combustion engine can be stopped from a state in which the internal combustion engine is in idling operation, by applying the torque (counter torque) in the reverse direction thereof by means of the motor, as described in prior art literatures, etc. In this case, the engine rotation speed of the internal combustion engine is forced to decrease, so when the rotation of the crankshaft of the internal combustion engine is stopped, a period of time in which the engine rotation speed passes a resonance rotation speed region lower than an idling rotation speed can be shortened. Accordingly, when the rotation of the crankshaft of the internal combustion engine is stopped in such a hybrid vehicle, the counter torque by the motor may be inputted to the internal combustion engine. Here, note that the expression "the rotation of the crankshaft of the internal combustion engine is stopped" is referred to as "the rotation of the internal combustion engine is stopped" in the following explanation.

Moreover, in the above-mentioned hybrid vehicle, air can be circulated through the exhaust passage of the internal combustion engine by generating a torque (i.e., a forward torque) in the direction of rotation of the internal combustion engine by means of the motor in a state where fuel injection in the internal combustion engine is stopped. Such motoring processing is carried out in order to scavenge the exhaust passage, as described, for example, in prior art literatures, etc. Or this motoring processing is also carried out, for example, in order to eliminate HC poisoning and S poisoning of a three-way catalyst which is arranged in the exhaust passage.

Further, in the above-mentioned hybrid vehicle, it has been newly found that in cases where the above-mentioned motoring processing is carried out (i.e., a forward torque is applied to the internal combustion engine) when the rotation of the internal combustion engine is stopped, and in cases where the rotation of the internal combustion engine is stopped by applying a counter torque to the internal combustion engine after completion of the motoring processing, noise and vibration accompanying the stop of the rotation of the internal combustion engine tend to be generated more easily than in cases where the rotation of the internal combustion engine is stopped by applying only a counter torque without carrying out the above-mentioned motoring processing.

The present disclosure has been made in view of the problems as mentioned above, and the object of the disclosure is to suppress the generation of noise or vibration accompanying the stop of rotation of an internal combustion engine as much as possible, in a control system which stops the rotation of the internal combustion engine by applying a counter torque thereto by means of a motor.

Solution to Problem

A control system for an internal combustion engine according to the present disclosure is provided with controller comprising at least one processor configured to selectively input a torque in the direction of rotation of the internal combustion engine and a torque in the direction of reverse rotation thereof to the internal combustion engine by means of a driving force of a motor, and control a magnitude of each torque. Then, the rotation of said internal combustion engine is stopped by the controller carrying out forced stop processing in which a counter torque, which is the torque in the reverse direction with respect to the direction of rotation of the internal combustion engine, is inputted to said internal combustion engine.

According to such a control system, when the rotation of the internal combustion engine is stopped, the rotation speed of the internal combustion engine is forced to decrease by performing forced stop processing. With this, it is possible to suppress resonance which would otherwise occur by the rotation speed of the internal combustion engine passing through the resonance rotation speed region which is at a side lower than the idling rotation speed, at the time when the rotation of the internal combustion engine is stopped. However, when the rotation of the internal combustion engine is stopped by the forced stop processing, after the execution of processing to input a forward torque to the internal combustion engine by the motor in a state where fuel injection in the internal combustion engine is stopped (specific motoring processing) is completed, noise and vibration tend to be easily generated despite that the above-mentioned resonance has been suppressed. This is because in this case, a change in the engine rotation speed accompanying the forced stop processing tends to become rapid, and noise and vibration, which cause occupants of a vehicle to feel uncomfortable, tend to easily occur with this rapid change of the engine rotation speed. This will be explained below.

A torque generated by the internal combustion engine at the start of the execution of the forced stop processing in the case where the rotation of the internal combustion engine is stopped by the forced stop processing from a state where the internal combustion engine is in idling operation is different from that in the case where the rotation of the internal combustion engine is stopped by the forced stop processing after the completion of the execution of the specific motoring processing. Specifically, in the former case, said generated torque becomes a forward torque due to the combustion pressure of the internal combustion engine, but on the other hand, in the latter case, the combustion of the internal combustion engine has been stopped, so said generated torque becomes a counter torque due to the friction of the internal combustion engine. Then, in the latter case, if the execution of the forced stop processing is started with the counter torque of the same magnitude as that of the forward torque in the former case being inputted to the internal combustion engine from the motor, a reduction torque given to the engine rotation speed by the motor for reducing the rotation speed of the internal combustion engine will become excessive, and the change of the engine rotation speed accompanying the forced stop processing tends to become so rapid that noise and vibration to cause the occupants of the vehicle to feel discomfort occur.

Accordingly, in the control system for an internal combustion engine according to the present disclosure, said controller makes said counter torque at a certain timing before said counter torque becomes a predetermined torque after the start of the execution of said forced stop processing smaller, in the case where said forced stop processing is carried out after the completion of execution of the specific motoring processing in which the torque in the direction of rotation of the internal combustion engine is inputted to said internal combustion engine in the state where the fuel injection in said internal combustion engine is stopped, than in the case where said forced stop processing is carried out without carrying out said specific motoring processing.

Here, said predetermined torque is set as a torque which reduces the rotation speed of the internal combustion engine as quick as possible within a range in which an uncomfortable feeling is not given to the occupants of the vehicle by the change in the rotation speed of the internal combustion engine accompanying the forced stop processing. Then, according to the control system for an internal combustion engine according to the present disclosure, by making the counter torque small as mentioned above, the controller serves to suppress a situation where the reduction torque to reduce the engine rotation speed at said certain timing becomes excessive, in the case where the forced stop processing is carried out after the completion of the execution of the specific motoring processing. In this case, a situation where the change in the engine rotation speed accompanying the forced stop processing becomes rapid is suppressed. For that reason, it is possible to suppress the generation of noise and vibration accompanying the stop of the rotation of the internal combustion engine as much as possible. Here, note that the specific motoring processing is carried out, when scavenging of an exhaust passage of the internal combustion engine is performed, or when poisoning of a three-way catalyst arranged in the exhaust passage of the internal combustion engine is eliminated, as mentioned above.

In addition, in the three-way catalyst arranged in the exhaust passage of the internal combustion engine, when HC poisoning in which HC in exhaust gas adheres to the catalyst or S poisoning in which sulfur components in exhaust gas adhere to the catalyst occurs, purification performance of the three-way catalyst may drop. Accordingly, it is desired that the HC poisoning and the S poisoning of the three-way catalyst be eliminated as much as possible.

Here, when the specific motoring processing is carried out, residual gases in the exhaust passage (and in the interiors of cylinders) are scavenged, and at the same time oxygen will be supplied to the three-way catalyst which is arranged in the exhaust passage. In that case, if it is assumed that HC poisoning or S poisoning has occurred in the three-way catalyst, oxygen thus supplied reacts with HC or sulfur components in the three-way catalyst, so that the HC poisoning and the S poisoning of the three-way catalyst can be eliminated. Then, when the specific motoring processing is carried out before the stop of the internal combustion engine, the purification performance of the three-way catalyst at the time of restart of the internal combustion engine is made as high as possible, whereby the deterioration of emissions can be suppressed.

Accordingly, the control system for an internal combustion engine according to the present disclosure, wherein said controller may be further configured to determine whether the execution of poisoning elimination processing with respect to an exhaust gas purification catalyst, which is the three-way catalyst arranged in the exhaust passage of said internal combustion engine, is requested or not. Then, the controller may execute or carry out said specific motoring processing, when the stop of the rotation of said internal combustion engine is requested and the execution of said poisoning elimination processing is requested.

Here, when the specific motoring processing is carried out, the HC poisoning and the S poisoning of the three-way catalyst may be eliminated. Accordingly, the above-mentioned poisoning elimination processing is carried out by the specific motoring processing. Then, in the above-mentioned control system, when the stop of the rotation of the internal combustion engine is further requested in a state where the execution of the poisoning elimination processing has been requested, the specific motoring processing is carried out as the poisoning elimination processing, before the forced stop processing is carried out. As a result of this, the poisoning of the exhaust gas purification catalyst is eliminated. Further, in the forced stop processing to be carried out after the completion of the execution of the specific motoring processing, the counter torque is made small, as mentioned above. Accordingly, according to the above-mentioned control system, when the rotation of the internal combustion engine is stopped, the generation of noise or vibration accompanying the stop of the rotation is suppressed as much as possible, and at the same time, when the internal combustion engine is restarted after that, the purification performance of the exhaust gas purification catalyst is made as high as possible.

In the control system for an internal combustion engine as mentioned above, in the case where said forced stop processing is carried out after the completion of the execution of said specific motoring processing, said controller may control said counter torque in such a manner that the reduction rate of the engine rotation speed of said internal combustion engine after the start of execution of said forced stop processing becomes substantially the same as the reduction rate in the case where said forced stop processing is carried out, without performing said specific motoring processing. According to this, in the case where the forced stop processing is carried out after the completion of the execution of the specific motoring processing, it becomes difficult to give a feeling different from that in the case where the forced stop processing is carried out without performing the specific motoring processing to the occupants of the vehicle. For that reason, the generation of noise or vibration, which the occupants of the vehicle feel uncomfortable, is suppressed as much as possible.

According to the present disclosure, it is possible to suppress the generation of noise or vibration accompanying the stop of rotation of an internal combustion engine as much as possible, in a control system which stops the rotation of the internal combustion engine by applying a counter torque thereto by means of a motor.

DESCRIPTION OF EMBODIMENTS

In the following, modes for carrying out the present disclosure will be specifically described as embodiments for illustrative purposes with reference to the drawings. It should be understood that the dimensions, materials, shapes, relative arrangements, and other features of the components that will be described in connection with the embodiments are not intended to limit the technical scope of the present disclosure only to them, unless stated otherwise.

First Embodiment

In this first embodiment, the present disclosure is applied to a hybrid vehicle which is provided with an internal combustion engine and a motor-generator.
(Schematic Construction of a Hybrid Vehicle)

Figure 1:
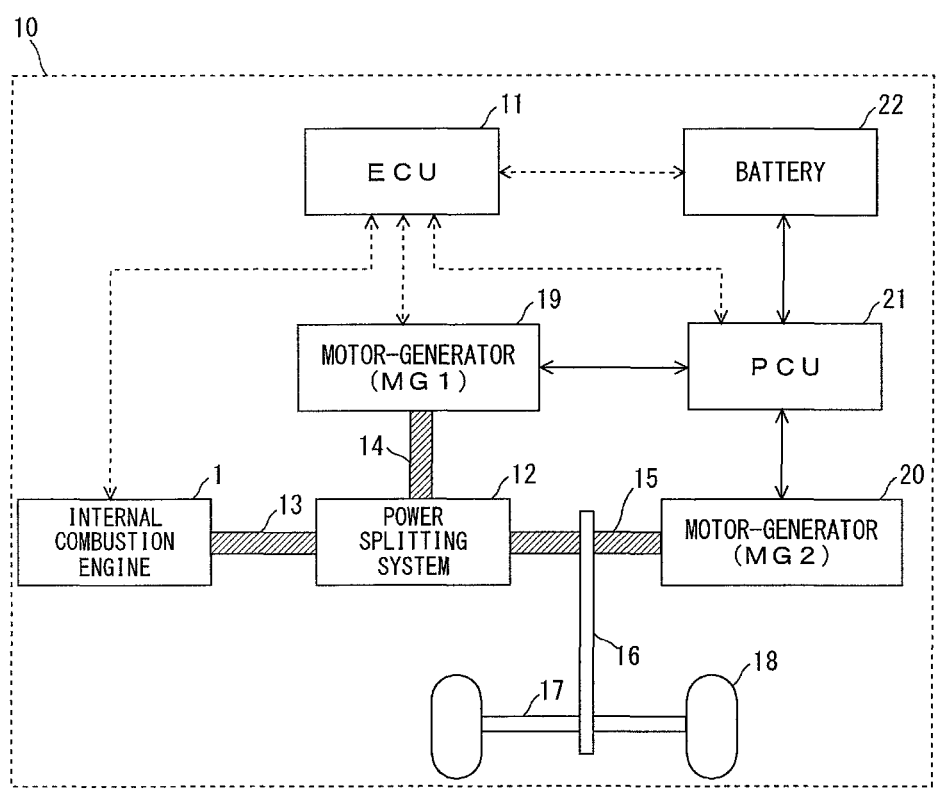
FIG. 1 is a view showing the schematic construction of a vehicle according to a first embodiment of the present disclosure.

FIG. 1 is a view showing the schematic construction of a vehicle 10 according to this first embodiment. The vehicle 10 shown in FIG. 1 has an internal combustion engine 1 as a driving source, a first motor-generator 19, and a second motor-generator 20. Here, the first motor-generator 19 and the second motor-generator 20 are known synchronous motors that can be driven by three-phase alternating current as motors and driven as electric generators.

The vehicle 10 is constructed to include, as main structural components, an ECU (Electronic Control Unit) 11, a power splitting system 12, a reduction gear 16, a PCU (Power Control Unit) 21, a battery 22, etc., in addition to the above-mentioned components. Then, as shown in FIG. 1, a crankshaft of the internal combustion engine 1 is connected with an output shaft 13, and the output shaft 13 is connected with the power splitting system 12. The power splitting system 12 is connected with the first motor-generator 19 through a power transmission shaft 14, and at the same time, is also connected with the second motor-generator 20 through a power transmission shaft 15. Here, the power splitting system 12 employs a well-known planetary gear mechanism (illustration omitted), and distributes, collects, and transmits the mechanical power of the internal combustion engine 1, the first motor-generator 19 and the second motor-generator 20. In addition, the reduction gear 16 is connected with the power transmission shaft 15, so that an output from the driving source is transmitted to a drive shaft 17 through the reduction gear 16. Then, drive wheels 18 connected with the drive shaft 17 are driven to rotate, thereby driving the vehicle 10.

Then, the PCU 21 is electrically connected with the first motor-generator 19, the second motor-generator 20 and the battery 22. Here, the PCU 21 is constructed to include an unillustrated inverter so as to be able to convert direct current power from the battery 22 into alternating current power, as well as to convert alternating current power generated by the first motor-generator 19 and the second motor-generator 20 into direct current power. The PCU 21 can convert the alternating current power generated by the first motor-generator 19 and the second motor-generator 20 into direct current power, and can supply the direct current power to the battery 22. In addition, the PCU 21 can convert the direct current power taken out from the battery 22 into alternating current power, and can supply the alternating current power to the first motor-generator 19 and the second motor-generator 20.

Here, the first motor-generator 19 generates alternating current power when driven by the internal combustion engine 1 through the power splitting system 12. In addition, the first motor-generator 19 can input a torque (forward torque) in the direction of rotation of the internal combustion engine 1 and a torque (counter torque) in the reverse direction of rotation of the internal combustion engine 1 to the internal combustion engine 1 through the power splitting system 12. Such a first motor-generator 19 is hereinafter referred to as an "MG1". Moreover, the second motor-generator 20 can carry out so-called regenerative power generation in which it operates as a generator by the input of axial rotation from the power transmission shaft 15 at the time of deceleration of the vehicle 10. Further, the second motor-generator 20 can apply a driving force to the vehicle 10 by outputting the axial rotation to the power transmission shaft 15. Such a second motor-generator 20 is hereinafter referred to as an "MG2".

(Construction of the Internal Combustion Engine)

Figure 2:
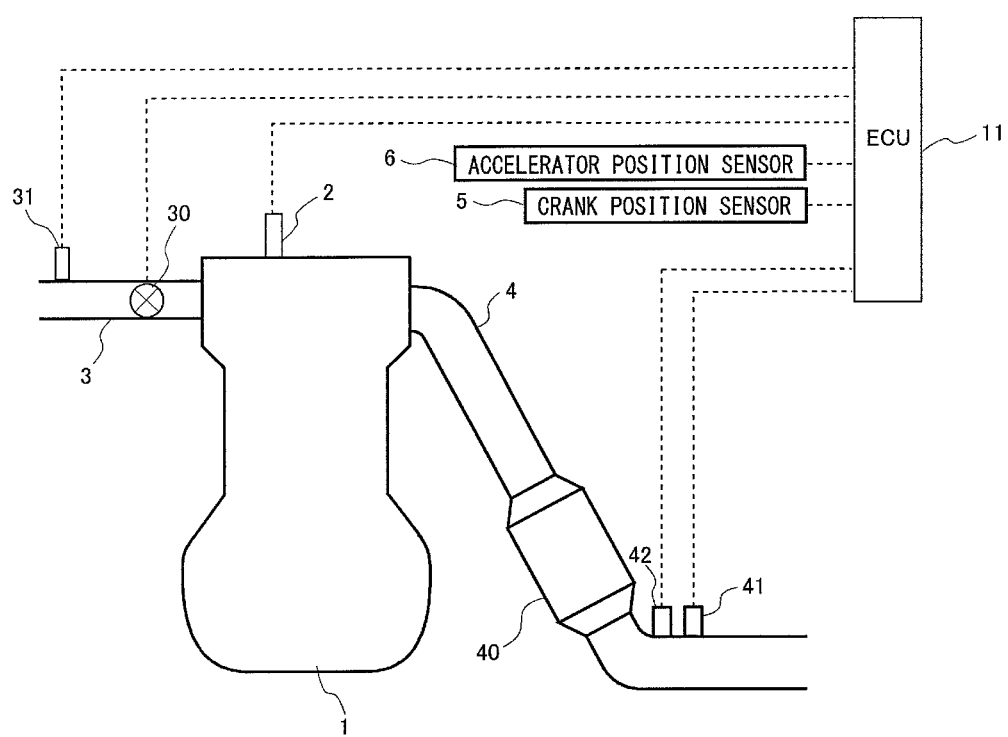
FIG. 2 is a view showing the schematic construction of an internal combustion engine according to the first embodiment of the present disclosure.

FIG. 2 is a view showing the schematic construction of the internal combustion engine 1. The internal combustion engine 1 shown in FIG. 2 is a spark ignition type internal combustion engine which is mounted on the vehicle 10 and which is operated by using gasoline as fuel. The internal combustion engine 1 is provided with fuel injection valves 2 for supplying fuel to unillustrated cylinders, respectively. Each of the fuel injection valves 2 may be constructed so as to directly inject fuel into a cylinder, or may be constructed so as to inject fuel into an intake port of the cylinder.

The internal combustion engine 1 is connected with an intake passage 3 for circulating fresh air (air) to be sucked into each cylinder. A throttle valve 30 for changing the channel cross section of the intake passage 3 thereby to adjust the amount of air to be sucked into the internal combustion engine 1 is arranged in the middle of the intake passage 3. An air flow meter 31 for detecting the amount (mass) of fresh air (air) flowing in the intake passage 3 is arranged in the intake passage 3 at a location upstream of the throttle valve 30.

The internal combustion engine 1 is connected with an exhaust passage 4 for circulating burnt gas (exhaust gas) discharged from each cylinder. A catalyst casing 40 is arranged in the middle of the exhaust passage 4. The catalyst casing 40 is constructed such that a catalyst carrier with an exhaust gas purification catalyst supported thereon is received in a cylindrical casing. Here, note that the exhaust gas purification catalyst is a three-way catalyst. Then, an air fuel ratio sensor 41 for detecting the air fuel ratio of gas flowing out from the catalyst casing 40 and an exhaust gas temperature sensor 42 for detecting the temperature of the gas flowing out from the catalyst casing 40 are arranged in the exhaust passage 4 downstream of the catalyst casing 40.

An ECU 11 is provided in combination with the internal combustion engine 1 as constructed in this manner. The ECU 11 is an electronic control unit which is provided with a CPU, a ROM, a RAM, a backup RAM, and so on. A variety of kinds of sensors such as a crank position sensor 5, an accelerator position sensor 6, etc., in addition to the air flow meter 31, the air fuel ratio sensor 41 and the exhaust gas temperature sensor 42 mentioned above are electrically connected to the ECU 11. Here, note that the crank position sensor 5 outputs an electric signal correlated with the rotational position of the output shaft (crankshaft) of the internal combustion engine 1. The accelerator position sensor 6 outputs an electric signal correlated with the amount of operation of an accelerator pedal (i.e., the degree of accelerator opening). The ECU derives the engine rotational speed of the internal combustion engine 1 based on the output signal of the crank position sensor 5, and also derives the engine load of the internal combustion engine 1 based on the output signal of the accelerator position sensor 6. Also, the ECU 11 estimates the temperature of the exhaust gas purification catalyst (hereinafter, also sometimes referred to as a "catalyst temperature") based on the output value of the exhaust gas temperature sensor 42.

In addition, the ECU 11 is electrically connected to a variety of kinds of equipment such as the fuel injection valves 2, the MG1, etc., as mentioned above. The ECU 11 electrically controls these variety of kinds of equipment based on the output signals of the above-mentioned variety of kinds of sensors.

With the vehicle 10 described above, a so-called intermittent operation may be carried out in which the vehicle 10 is operated by the driving force from the MG2 in a state where the rotation of the internal combustion engine 1 is stopped. In this intermittent operation, the vehicle is operated in an automatic stop manner in which the rotation of the crankshaft of the internal combustion engine 1 is automatically stopped, or in an automatic starting manner in which the rotation of the crankshaft of the internal combustion engine 1 is automatically started during the stop of the rotation thereof. Here, the ECU 11 can determine, based on a well-known technique, whether the execution of the intermittent operation (here, automatic stop of the internal combustion engine 1) is possible. For example, when the engine rotation speed of the internal combustion engine 1 becomes equal to or less than a predetermined rotation speed, the ECU 11 can permit the execution of intermittent operation (in other words, automatic stop of the internal combustion engine 1). Then, when permitting the automatic stop of the internal combustion engine 1, the ECU 11 requests the stop of the rotation of the internal combustion engine 1. Note that the processing of the ECU 11 to automatically stop the rotation of the crankshaft of the internal combustion engine 1 is referred to as "automatic stop processing". Here, the ECU 11 can automatically stop the internal combustion engine 1 by carrying out the processing to stop fuel injection from the fuel injection valves 2 ("hereinafter, sometimes referred to as "fuel stop processing").

Further, when carrying out the automatic stop processing, the ECU 11 can forcibly reduce the rotation speed of the internal combustion engine 1 by inputting a counter torque to the internal combustion engine 1 with the use of the MG1. The processing to input the counter torque to the internal combustion engine 1 with the use of the MG1, which is carried out by the ECU 11, is hereinafter referred to as "forced stop processing". Then, the ECU 11 carries out the forced stop processing, whereby when the rotation of the crankshaft of the internal combustion engine 1 is stopped, a period of time in which the rotation speed of the internal combustion engine 1 passes a resonance rotation speed region lower than an idling rotation speed can be shortened. Here, note that the expression "the rotation of the crankshaft of the internal combustion engine 1 is stopped" is referred to as "the rotation of the internal combustion engine 1 is stopped" in the following explanation. Here, the ECU 11 can also input a forward torque to the internal combustion engine 1 by using the MG1. Then, in this embodiment, a controller according to the present disclosure is achieved by the ECU 11 which selectively inputs the forward torque and the counter torque to the internal combustion engine 1 by using the MG1, and which at the same time controls the magnitudes of the torques.

(Forced Stop Processing)

Figure 3:
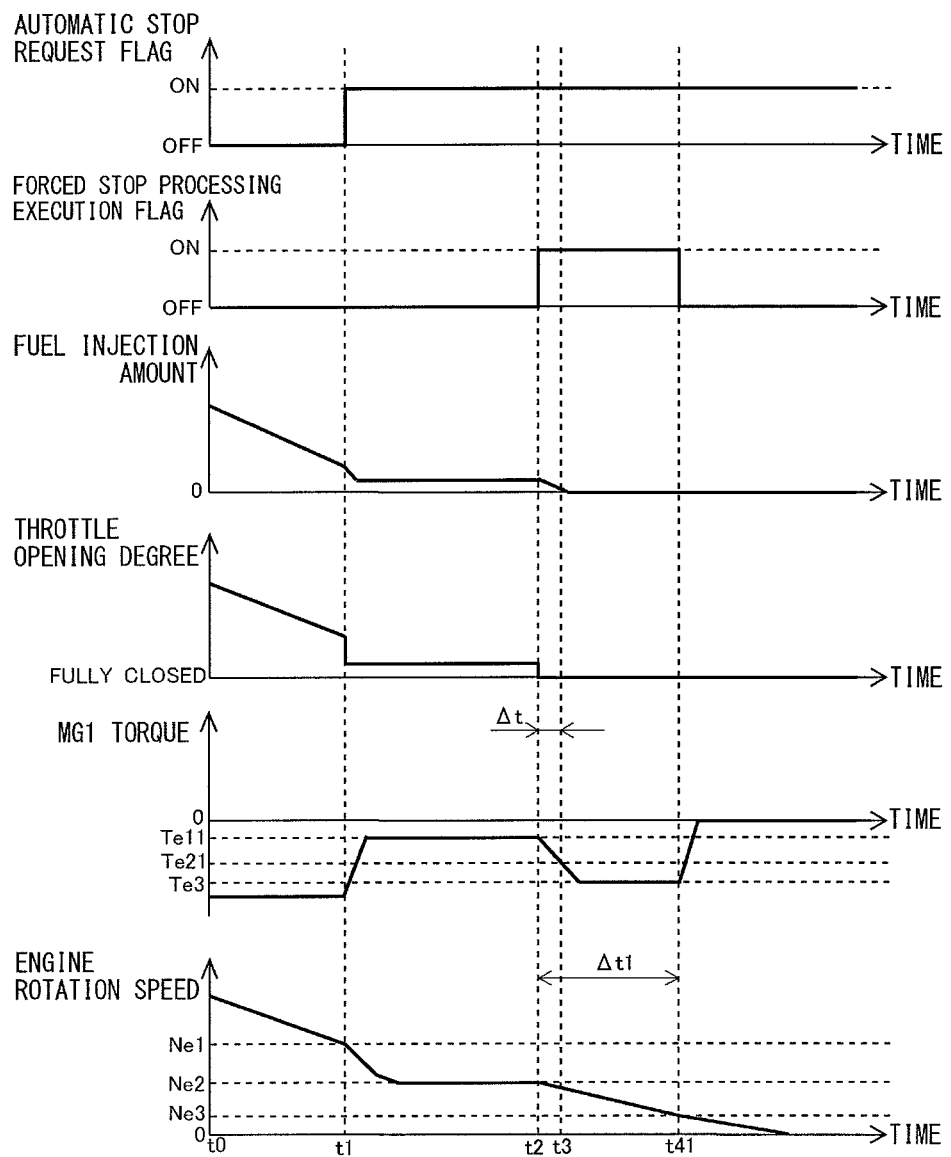
FIG. 3 is a timing chart showing the changes over time of an automatic stop request flag, a forced stop processing execution flag, a fuel injection amount, a throttle opening degree, an MG1 torque and an engine rotation speed, in cases where forced stop processing is further carried out when the internal combustion engine is automatically stopped.

Here, a method for carrying out the forced stop processing will be explained based on FIG. 3. FIG. 3 is a timing chart showing the changes over time of an automatic stop request flag, a forced stop processing execution flag, a fuel injection amount, an opening degree of the throttle valve 30 (throttle opening degree), a torque generated by the MG1 (MG1 torque) and an engine rotation speed, in cases where the forced stop processing is further carried out when the internal combustion engine 1 is automatically stopped. Here, note that the automatic stop request flag is a flag which is set to ON, when a condition for automatically stopping the internal combustion engine 1 is satisfied. In addition, the forced stop processing execution flag is a flag which is set to ON, when an execution condition for the forced stop processing is satisfied.

In the control shown in FIG. 3, the unillustrated accelerator opening degree is made gradually smaller from a time point t0 to a time point t1. According to this, as shown in FIG. 3, the throttle opening degree and the fuel injection amount become gradually smaller, and the engine rotation speed accordingly drops. Then, at the time point t1, required power with respect to the internal combustion engine 1 becomes less than a predetermined threshold value, and so the condition for automatically stop the internal combustion engine 1 is satisfied. Here, note that the predetermined threshold value is a well-known threshold value which determines whether the internal combustion engine 1 is made to stop automatically. Then, as shown in FIG. 3, at the time point t1, the automatic stop request flag is set to ON. Also, note that the engine rotation speed at this time becomes Ne1.

Then, in the control shown in FIG. 3, even if the automatic stop request flag is set to ON, the fuel stop processing is not immediately carried out, but after the automatic stop request flag is set to ON, processing to make the internal combustion engine 1 idle for a certain period of time ("hereinafter, sometimes referred to as "idle processing") is carried out. This idle processing is carried out in order to return predetermined devices (VVT, etc.) with which the internal combustion engine 1 is provided to their predetermined starting states, before the rotation of the internal combustion engine 1 is stopped. Or the idle processing is carried out in order to supply HC to the exhaust gas purification catalyst to some extent, before the rotation of the internal combustion engine 1 is stopped. Then, in the control shown in FIG. 3, the idle processing is carried out by the ECU 11 from the time point t1 to a time point t2. Here, note that the period of execution of the idle processing (i.e., a period of time from the time point t1 to the time point t2) is a period of time which has been set in advance.

Figure 4:
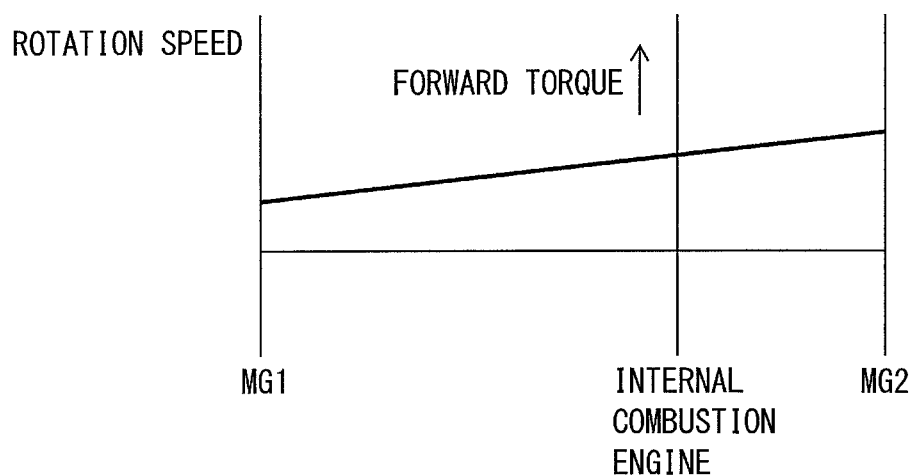
FIG. 4 is a collinear view of a planetary gear mechanism when idle processing is carried out in the timing chart shown in FIG. 3.

Thus, when the idle processing is carried out, the MG1 is in a state where a slight amount of electric power is generated (i.e., a slight power generation state). In this slight power generation state, the MG1 will input counter torque to the internal combustion engine 1. As shown in FIG. 3, the MG1 torque at this time is Te11, and this MG1 torque is a relatively small counter torque. In addition, a collinear view of the planetary gear mechanism at the time when the idle processing is carried out is shown in FIG. 4. This collinear view represents the rotational speeds of the MG1, the MG2 and the internal combustion engine 1, wherein the rotation speed of the internal combustion engine 1 in FIG. 4 corresponds to a rotation speed Ne2 of the internal combustion engine 1 during the execution of the idle processing, and the rotation speed of the MG2 in FIG. 4 corresponds to the rotation speed of the power transmission shaft 15 which correlates with the vehicle speed of the vehicle 10. Also, the rotational speed of the MG1 depends on the above-mentioned rotation speed Ne2 and the gear ratio in the planetary gear mechanism. Here, during the execution of the idle processing, fuel is burned in the cylinders of the internal combustion engine 1. For that reason, due to the combustion pressure in each cylinder, a torque generated by the internal combustion engine 1 (hereinafter, also referred to as a generated torque of the internal combustion engine 1) becomes a forward torque, during the execution of the idle processing.

When the idle processing is carried out for the predetermined period of time, the ECU 11 terminates the idle processing. The ECU 11 terminates the idling operation of the internal combustion engine 1 by carrying out the fuel stop processing. Thereafter, at the time point t2 at which the idle processing is terminated, the forced stop processing execution flag is set to ON. In that case, the ECU 11 starts the execution of the forced stop processing. Here, at the start of the execution of the forced stop processing, the internal combustion engine 1 generates the forward torque, as mentioned above. In addition, actually, the internal combustion engine 1 continues to generate the forward torque for a certain period of time, even after the ECU 11 starts the execution of the fuel stop processing. Accordingly, the ECU 11 starts the execution of the forced stop processing by inputting the counter torque in consideration of the forward torque of the internal combustion engine 1 to the internal combustion engine 1. In the control shown in FIG. 3, the execution of the forced stop processing is started so that the MG1 torque becomes Te21 after a predetermined period of time Δt has elapsed from the start of the execution of the forced stop processing. An absolute value of this MG1 torque Te21 is larger than the above-mentioned forward torque of the internal combustion engine 1. Moreover, the absolute value of the MG1 torque Te21 is decided so that the MG1 torque becomes a predetermined torque Te3 to be described later as quickly as possible within a range in which a change in the rotation speed of the internal combustion engine 1 does not give an uncomfortable feeling to the occupants of the vehicle 10.

Then, in the control shown in FIG. 3, the MG1 torque becomes the predetermined torque Te3 after a time point t3, accompanying the execution of the forced stop processing. In other words, in the control shown in FIG. 3, the forced stop processing is carried out so that the MG1 torque at the time point t3, which is a timing before the MG1 torque becomes the predetermined torque Te3 after the start of the execution of the forced stop processing, becomes Te21. Here, the predetermined torque Te3 is set as a torque which reduces the rotation speed of the internal combustion engine 1 as quickly as possible within a range in which uncomfortable or unpleasant feeling is not given to the occupants of the vehicle 10 by the change in the rotation speed of the internal combustion engine 1 accompanying the forced stop processing. Then, after the time point t2, the rotation speed of the internal combustion engine 1 decreases by a substantially constant rate accompanying the execution of the forced stop processing. Thereafter, at a time point t41 at which the engine rotation speed becomes Ne3, the forced stop processing execution flag is set to OFF, and the execution of the forced stop processing is terminated. In other words, in the control shown in FIG. 3, the forced stop processing will be carried out in a period of time Δt1 from the time point t2 to the time point t41. Then, after the time point t41, too, the rotation speed of the internal combustion engine 1 decreases, and finally the engine rotation speed becomes 0, so the rotation of the internal combustion engine 1 is stopped. Here, note that the above-mentioned engine rotation speed Ne3 is a determination threshold value for setting the forced stop processing execution flag to OFF.

(Poisoning Elimination Processing)

The exhaust gas purification catalyst received in the catalyst casing 40 may generate so-called HC poisoning and S poisoning. Hydrocarbons or sulfur components contained in the exhaust gas adhere to active sites of the exhaust gas purification catalyst, whereby contact between the active sites and harmful gas components in the exhaust gas is inhibited, thereby generating so-called HC poisoning and S poisoning in which the purification performance of the exhaust gas purification catalyst is reduced. However, because the exhaust gas purification catalyst is the three-way catalyst, the hydrocarbons and the sulfur components adhered to the active sites can be oxidized by exposing the exhaust gas purification catalyst to an atmosphere of excessive oxygen.

Here, the ECU 11 can input a forward torque to the internal combustion engine 1 by using the MG1. Then, when processing to input the forward torque to the internal combustion engine 1 is carried out in a state where the fuel injection in the internal combustion engine 1 is stopped, oxygen will be able to be supplied to the exhaust gas purification catalyst. For that reason, the hydrocarbons and the sulfur components adhered to the active sites of the exhaust gas purification catalyst can be oxidized by the above-mentioned processing. In other words, with this, it is possible to attain elimination of the HC poisoning and the S poisoning of the exhaust gas purification catalyst. Here, note that the processing to input the forward torque to the internal combustion engine 1 in the state where the fuel injection in the internal combustion engine 1 is stopped is hereinafter referred to as "motoring processing". Then, because the elimination of the HC poisoning and the S poisoning of the exhaust gas purification catalyst can be attained by the motoring processing, the motoring processing corresponds to processing to eliminate the poisoning of the exhaust gas purification catalyst (hereinafter, sometimes referred to as "poisoning elimination processing".

Figure 5:
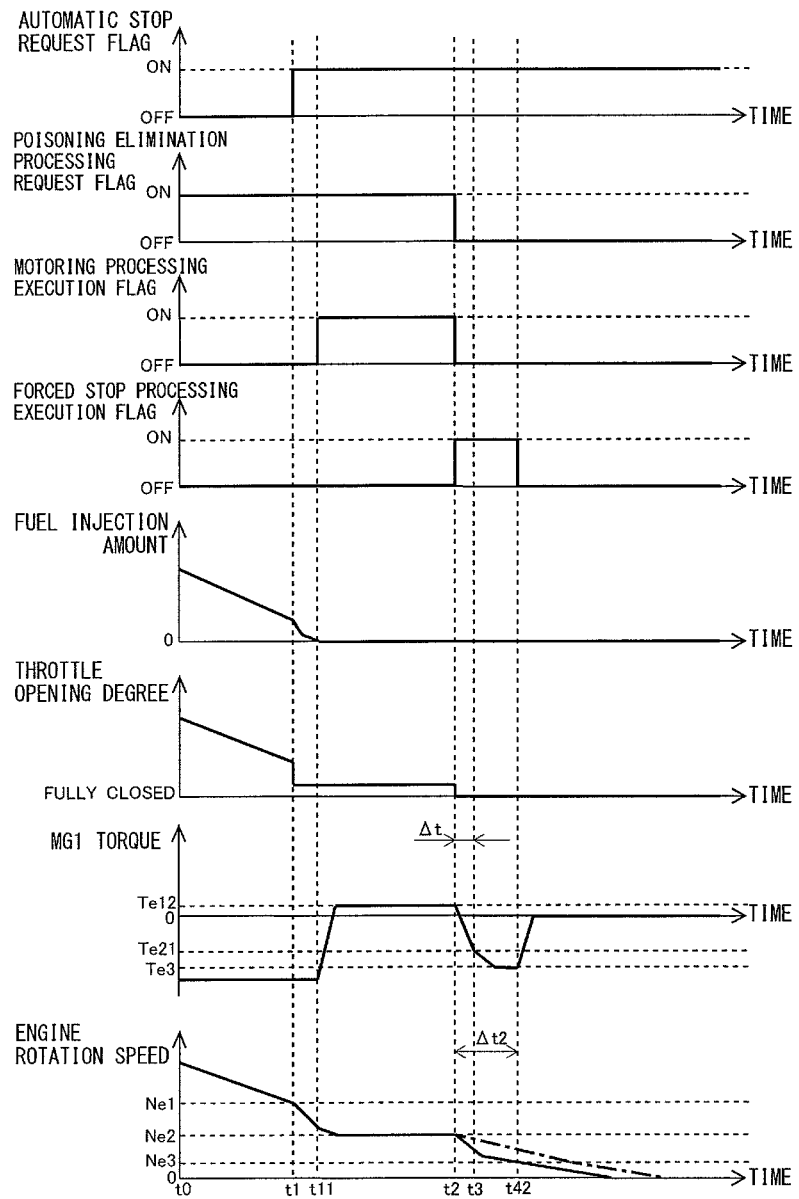
FIG. 5 is a timing chart showing the changes over time of the automatic stop request flag, a poisoning elimination processing request flag, a motoring processing execution flag, the forced stop processing execution flag, the fuel injection amount, the throttle opening degree, the MG1 torque, and the engine rotation speed, in cases where motoring processing is carried out as poisoning elimination processing and forced stop processing is further carried out thereby to stop the rotation of the internal combustion engine, when the internal combustion engine is automatically stopped.

Here, an execution method for the motoring processing will be explained based on FIG. 5. FIG. 5 is a timing chart showing the changes over time of the automatic stop request flag, a poisoning elimination processing request flag, a motoring processing execution flag, the forced stop processing execution flag, the fuel injection amount, the throttle opening degree, the MG1 torque, and the engine rotation speed, in cases where the motoring processing is carried out as the poisoning elimination processing and the forced stop processing is further carried out thereby to stop the rotation of the internal combustion engine 1, when the internal combustion engine 1 is automatically stopped. Here, note that the poisoning elimination processing request flag is a flag which is set to ON, when the execution of the poisoning elimination processing is requested. In addition, the motoring processing execution flag is a flag which is set to ON, when an execution condition for the motoring processing is satisfied.

In the control shown in FIG. 5, at the time point t1, the automatic stop request flag is set to ON, similar to the above-mentioned control shown in FIG. 3. Here, note that at this time, the poisoning elimination processing request flag has been set to ON, and the execution of the poisoning elimination processing has been requested.

The ECU 11 carries out the motoring processing as the poisoning elimination processing, when the stop of the rotation of the internal combustion engine 1 is requested and the execution of the poisoning elimination processing is requested. Accordingly, first, at the time point t1, the ECU 11 carries out the fuel stop processing in order to carry out the motoring processing. In that case, at a time point t11, the fuel injection amount becomes zero. Then, at the time point t11 at which the fuel injection in the internal combustion engine 1 becomes a stopped state, the motoring processing execution flag is set to ON, and the ECU 11 carries out the motoring processing by inputting a forward torque to the internal combustion engine 1.

As shown in FIG. 5, during the execution of the motoring processing, the rotation speed of the internal combustion engine 1 is controlled to Ne2 by means of the MG1 torque. Moreover, the fuel injection amount is made to be 0, and at the same time, the throttle valve 30 has been opened. For that reason, oxygen will be supplied to the exhaust gas purification catalyst. With this, it is possible to attain the elimination of the HC poisoning and the S poisoning of the exhaust gas purification catalyst.

Figure 6:
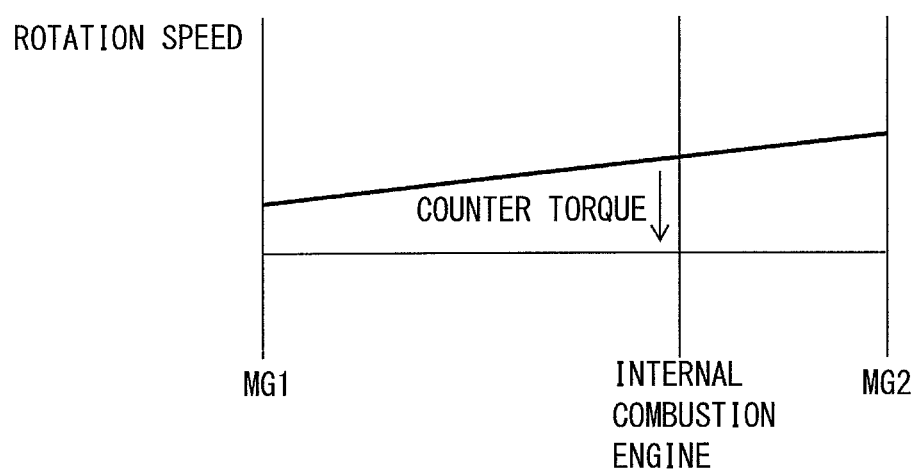
FIG. 6 is a collinear view of the planetary gear mechanism when motoring processing is carried out in the timing chart shown in FIG. 5.

Then, during the execution of the motoring processing, the MG1 torque is controlled to Te12. A collinear view of the planetary gear mechanism at this time is shown in FIG. 6. In FIG. 6, the MG1, the MG2 and the rotation speed of the internal combustion engine 1 are the same as those values shown in the above-mentioned FIG. 4. However, unlike the above-mentioned FIG. 4, the torque generated by the internal combustion engine 1 at this time is a counter torque. This is due to the friction of the internal combustion engine 1. Here, note that during the execution of the motoring processing, the fuel injection from the fuel injection valves 2 is stopped, and so, the combustion pressure of the internal combustion engine 1 becomes zero.

Here, when the poisoning elimination processing is carried out for the predetermined period of time, it is terminated. That is, as shown in FIG. 5, the poisoning elimination processing request flag is set to OFF at the time point t2 at which a certain predetermined period of time has elapsed after the execution of poisoning elimination processing is started at the time point t11. In that case, the motoring processing execution flag is also set to OFF at the same timing, and the motoring processing (poisoning elimination processing) is terminated.

Thus, at the time point t2 at which the motoring processing (poisoning elimination processing) is terminated, the forced stop processing execution flag is set to ON. In that case, the ECU 11 starts the execution of the forced stop processing. In the control shown in FIG. 5, similar to the above-mentioned control shown in FIG. 3, the execution of the forced stop processing is started so that the MG1 torque becomes Te21 at the time point t3 which is the above-mentioned timing. In addition, in the control shown in FIG. 5, the rotation speed of the internal combustion engine 1 at the time point t2 at which the execution of the forced stop processing is started becomes Ne2 which is the same as the rotation speed of the internal combustion engine 1 at the time point t2 shown in the above-mentioned FIG. 3. For that reason, in the control shown in FIG. 5, similar to the above-mentioned control shown in FIG. 3, the MG1 torque becomes the predetermined torque Te3 after the time point t3, accompanying the execution of the forced stop processing.

Here, a comparison is made between the rotation speeds of the internal combustion engine 1 after the time point t2 in FIG. 3 and FIG. 5. Note that in FIG. 5, the above-mentioned change over time of the rotation speed of the internal combustion engine 1 after the time point t2 shown in the FIG. 3 is shown as a reference by an alternate long and short dash line. In that case, it is found that the change of the engine rotation speed in FIG. 5 is more rapid than the change of the engine rotation speed in FIG. 3. This results from the fact that the generated torque of the internal combustion engine 1 at the time point t2 is a forward torque in FIG. 3, but on the other hand, it is a counter torque in FIG. 5. Specifically, as described in the above-mentioned explanation of FIG. 3, the absolute value of the MG1 torque Te21 is decided so that it is larger than the forward torque of the internal combustion engine 1, and that the MG1 torque becomes the predetermined torque Te3 as quickly as possible within a range in which a change in the rotation speed of the internal combustion engine 1 does not give an uncomfortable feeling to the occupants of the vehicle 10. For that reason, when a counter torque of Te21 is inputted to the internal combustion engine 1 by the MG1 in a state where the internal combustion engine 1 generates not a forward torque but a counter torque, a reduction torque to the engine rotation speed for reducing the rotation speed of the internal combustion engine 1 will become excessive, thus giving rise to a fear that the change in the rotation speed of the internal combustion engine 1 may become rapid, to such an extent that the occupants of the vehicle 10 feel uncomfortable.

Then, in the control shown in FIG. 5, the reduction rate of the rotation speed of the internal combustion engine 1 accompanying the forced stop processing becomes larger than that in the above-mentioned control shown in FIG. 3. For that reason, a period of execution $\Delta t2$ of the forced stop processing in FIG. 5 becomes shorter than the period of execution $\Delta t1$ of the forced stop processing in FIG. 3.

As described above, in cases where the rotation of the internal combustion engine 1 is stopped by the forced stop processing after the completion of the execution of the motoring processing, when a counter torque is inputted, as in the case where the forced stop processing is carried out after the end of execution of the idle processing, the change of the rotation speed of the internal combustion engine 1 accompanying the forced stop processing tends to become rapid. As a result, noise and vibration accompanying the stop of the rotation of the internal combustion engine becomes apt to occur.

(Counter Torque Adjustment Processing)

Accordingly, in the control system for an internal combustion engine according to the present disclosure, in the case where the forced stop processing is carried out after the completion of the execution of the motoring processing, the ECU 11 makes the counter torque at a timing before the counter torque becomes a predetermined torque after the start of the execution of the forced stop processing smaller than in the case where the forced stop processing is carried out without carrying out the motoring processing. In this case, the occurrence of a situation is suppressed in which the reduction torque to reduce the engine rotation speed at the timing becomes excessive in the case where the forced stop processing is carried out after the completion of the execution of the specific motoring processing. As a result, a situation where a change in the engine rotation speed accompanying the forced stop processing becomes rapid is suppressed. This can suppress the generation of noise and vibration accompanying the stop of the rotation of the internal combustion engine 1 as much as possible. Here, note that such processing to be carried out by the ECU 11 is hereinafter referred to as "counter torque adjustment processing".

Figure 7:
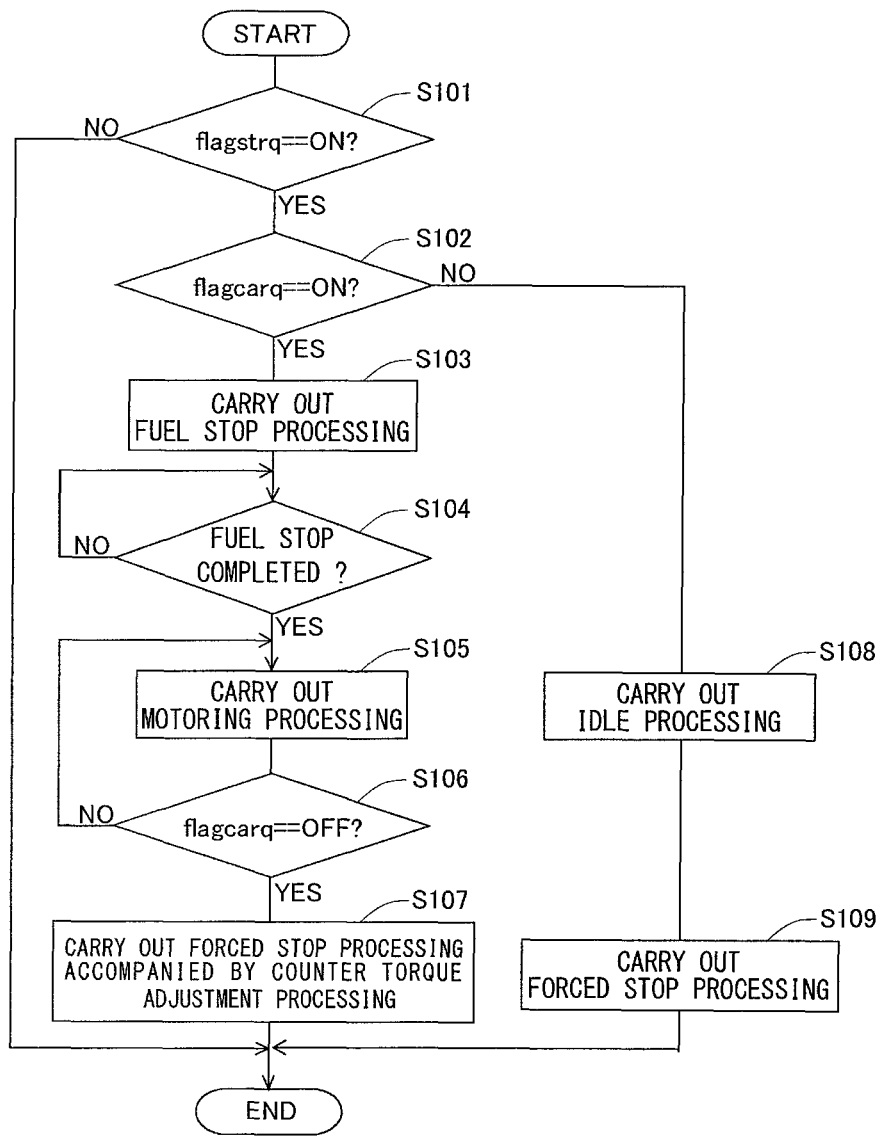
FIG. 7 is a flow chart showing a control flow which is executed in a control system for an internal combustion engine according to the first embodiment of the present disclosure.

Here, a control procedure performed by the control system for an internal combustion engine according to the present disclosure will be explained with FIG. 7. FIG. 7 is a flow chart showing a control flow or routine according to this embodiment. In this embodiment, this flow or routine is carried out at a predetermined operation interval in a repeated manner by the ECU 11 during the operation of the internal combustion engine 1.

In this flow or routine, first in step S101, it is determined whether the automatic stop request flag flagstrq has been set to ON. The automatic stop request flag flagstrq is a flag which is set by different processing from this flow, and which is set to ON, for example, when the required power with respect to the internal combustion engine 1 becomes less than a predetermined threshold value. Then, if an affirmative determination is made in step S101, the routine of the ECU 11 goes to the processing of step S102, whereas if a negative determination is made in step S101, the execution of this routine is terminated.

If an affirmative determination is made in step S101, subsequently in step S102, it is determined whether the poisoning elimination processing request flag flagcarq has been set to ON. In other words, in step S102, it is determined whether the execution of the poisoning elimination processing with respect to the exhaust gas purification catalyst has been requested. Then, if an affirmative determination is made in step S102, the routine of the ECU 11 goes to the processing of step S103, whereas if a negative determination is made in step S102, the routine of the ECU 11 goes to the processing of step S108. Here, note that the ECU 11 functions as a controller according to the present disclosure by making the above determination.

Here, the poisoning elimination processing request flag flagcarq is a flag which can be set as follows. In cases where the catalyst temperature is lower than a predetermined temperature, it is assumed that the execution of the poisoning elimination processing has been requested, the poisoning elimination processing request flag flagcarq is set to ON. Here, the predetermined temperature is defined as a temperature at which the deterioration of the exhaust gas purification catalyst is promoted, when the poisoning elimination processing is carried out in a state where the catalyst temperature has become equal to or higher than the predetermined temperature. Accordingly, when the catalyst temperature is lower than this predetermined temperature, a situation where the exhaust gas purification catalyst deteriorates according to the execution of the poisoning elimination processing is suppressed, whereby the poisoning elimination processing can be carried out in an appropriate manner.

In addition, for example, in cases where the air fuel ratio of the gas detected by the air fuel ratio sensor 41 is equal to or lower than a stoichiometric air fuel ratio, it is assumed that the execution of the poisoning elimination processing has been requested, the poisoning elimination processing request flag flagcarq is set to ON. Here, if the air fuel ratio of the gas detected by the air fuel ratio sensor 41 is a lean air fuel ratio higher than the stoichiometric air fuel ratio, it can be assumed that neither HC poisoning nor S poisoning has occurred in the exhaust gas purification catalyst. This is because in this case, the exhaust gas purification catalyst has already been exposed to an atmosphere of excessive oxygen, so that the hydrocarbons (HC) and the sulfur components adhered to the active sites can be oxidized. Accordingly, by performing the poisoning elimination processing under the condition that the exhaust gas purification catalyst can be subjected to HC poisoning or S poisoning, i.e., in the case where the air fuel ratio of the gas detected by the air fuel ratio sensor 41 is equal to or lower than the stoichiometric air fuel ratio, the poisoning elimination processing will be carried out in an effective manner.

If an affirmative determination is made in step S102, then in step S103, the fuel stop processing is carried out. Subsequently, in step S104, it is determined whether the stop of fuel injection from the fuel injection valves 2 has been completed. Then, if an affirmative determination is made in step S104, the routine of the ECU 11 goes to the processing of step S105, whereas if a negative determination is made in step S104, the ECU 11 repeats the processing of step S104.

If an affirmative determination is made in step S104, then in step S105, the motoring processing is carried out. In step S105, the motoring processing is carried out by the input of a forward torque to the internal combustion engine 1 by means of the MG1, after a determination is made in step S104 that the stop of fuel injection from the fuel injection valves 2 has been completed, i.e., in a state where the fuel injection in the internal combustion engine 1 has been stopped.

Subsequently in step S106, it is determined whether the poisoning elimination processing request flag flagcarq has become OFF. As described in the above-mentioned explanation of FIG. 5, the poisoning elimination processing (motoring processing) is terminated when carried out for the predetermined period of time. Accordingly, when the certain predetermined period of time elapses after the execution of the motoring processing is started in step S105, the poisoning elimination processing request flag flagcarq becomes OFF, and the execution of the motoring processing is terminated. If an affirmative determination is made in step S106, the routine of the ECU 11 goes to the processing of step S107, whereas if a negative determination is made in step S106, the routine of the ECU 11 returns to the processing of step S105.

If an affirmative determination is made in step S106, subsequently in step S107, the forced stop processing accompanied by the counter torque adjustment processing is carried out. In step S107, the forced stop processing is carried out after the counter torque at the timing before the counter torque becomes the predetermined torque after the start of the execution of the forced stop processing is made smaller than the counter torque in the case where the forced stop processing is carried out without carrying out the motoring processing. Here, note that the details of this will be described later. Then, after the processing of step S107, the execution of this flow or routine is ended.

On the other hand, if a negative determination is made in step S102, then in step S108, the idle processing is carried out. Then, in step S108, when the idle processing is carried out for the predetermined period of time, the forced stop processing is subsequently carried out in step S109. Then, after the processing of step S109, the execution of this flow or routine is ended. Here, note that the details of the processing of steps S108 and S109 are as described in the above-mentioned explanation of FIG. 3.

The ECU 11 carries out the control flow or routine as mentioned above, whereby the generation of noise and vibration accompanying the stop of the rotation of the internal combustion engine 1 can be suppressed as much as possible.

Figure 8:
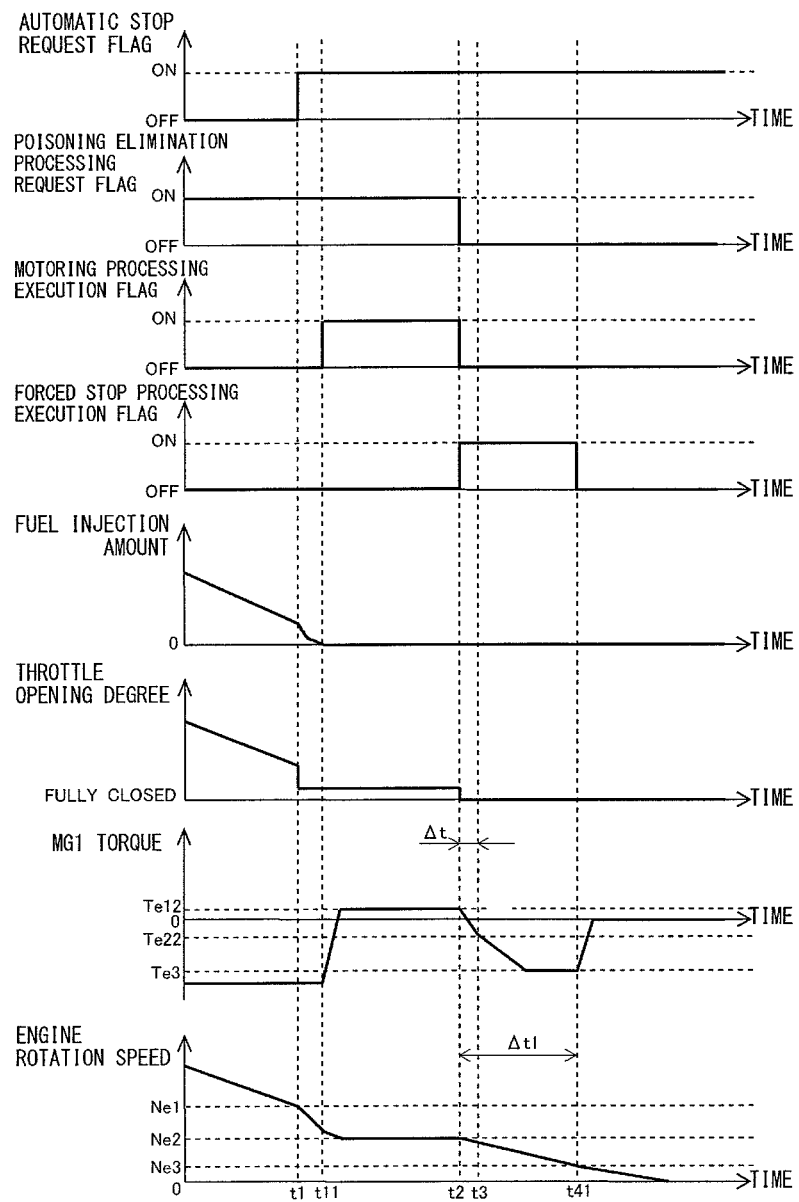
FIG. 8 is a timing chart showing the changes over time of the automatic stop request flag, the poisoning elimination processing request flag, the motoring processing execution flag, the forced stop processing execution flag, the fuel injection amount, the throttle opening degree, the MG1 torque, and the engine rotation speed, in cases where counter torque adjustment processing is further carried out in the control shown in FIG. 5.

Next, the MG1 torque at the time when the counter torque adjustment processing is carried out will be explained based on FIG. 8. FIG. 8 is a timing chart showing the changes over time of the automatic stop request flag, the poisoning elimination processing request flag, the motoring processing execution flag, the forced stop processing execution flag, the fuel injection amount, the throttle opening degree, the MG1 torque, and the engine rotation speed, in cases where counter torque adjustment processing is further carried out in the above-mentioned control shown in FIG. 5.

In FIG. 8, the same control as the above-mentioned control shown in FIG. 5 is carried out until the time point t2 at which the motoring processing (poisoning elimination processing) is terminated.

Then, when the forced stop processing execution flag is set to ON at the time point t2, the ECU 11 starts the execution of the forced stop processing. Here, in the control shown in FIG. 8, the forced stop processing accompanied by the counter torque adjustment processing is carried out. Specifically, the execution of the forced stop processing is started so that the MG1 torque becomes Te22 at the time point t3 which is the above-mentioned timing. This MG1 torque Te22 is a counter torque which is smaller than the MG1 torque Te21 in the case where the forced stop processing is carried out, without carrying out the motoring processing, i.e., in the case where the forced stop processing is carried out after the idle processing is carried out, as shown in the above-mentioned FIG. 3. This will be explained below in detail.

As mentioned above, the generated torque of the internal combustion engine 1 is distributed by the power splitting system 12. Here, the power splitting system 12 is a well-known planetary gear mechanism, and is constructed to include a sun gear, a ring wheel and pinion gears. Then, an input torque Ti, which is inputted to the power transmission shaft 14 connected with the MG1 by means of the generated torque Te of the internal combustion engine 1, is represented by the following equation 1.

$$Ti = Te \times z1/(z1+z2) \qquad \text{Expression 1,}$$

Ti: the input torque to the power transmission shaft 14,

Te: the generated torque of the internal combustion engine 1, z1: the number of teeth of the sun gear, and z2: the number of teeth of the ring wheel.

Here, when the generated torque of the internal combustion engine 1 after the lapse of the predetermined period of time Δt from the end of execution of the idle processing shown in the above-mentioned FIG. 3 (in other words, at the time point t3 in the above-mentioned FIG. 3) is represented by Te1, a total value T1 of the torque in the power transmission shaft 14 at this time is represented by the following equation 2.

$$T1 = (Te1 \times z1/(z1+z2)) + Te21 \qquad \text{Expression 2,}$$

T1: the total value of the torque in the power transmission shaft 14,

Te1: the generated torque of the internal combustion engine 1, and

Te21: the MG1 torque.

On the other hand, when the generated torque of the internal combustion engine 1 after the lapse of the predetermined period of time Δt from the completion of execution of the motoring processing shown in FIG. 8 (in other words, at the time point t3 in FIG. 8) is represented by Te2, a total value T2 of the torque in the power transmission shaft 14 at this time is represented by the following equation 3.

$$T2 = (Te2 \times z1/(z1+z2)) + Te22 \qquad \text{Expression 3,}$$

T2: the total value of the torque in the power transmission shaft 14,

Te2: the generated torque of the internal combustion engine 1, and

Te22: the MG1 torque.

Then, in the counter torque adjustment processing, the counter torque is adjusted so that after the time point t2, the rotation speed of the internal combustion engine 1 decreases by a substantially constant rate accompanying the execution of the forced stop processing. Specifically, the MG1 torque in the forced stop processing is adjusted by the counter torque adjustment processing so that the reduction rate of the rotation speed of the internal combustion engine 1 after the time point t2 in FIG. 8 becomes substantially the same as the reduction rate of the rotation speed of the internal combustion engine 1 after the time point t2 shown in the above-mentioned FIG. 3.

In this case, the total value of the torque in the power transmission shaft 14 at the time point t3, which is the above-mentioned timing, is made the same between in the case where the forced stop processing is carried out after the completion of the execution of the motoring processing, and in the case where the forced stop processing is carried out after the end of the execution of the idle processing. Thus, T1=T2. Accordingly, the following expression 4 is derived.

$$(Te1 \times z1/(z1+z2)) + Te21 = (Te2 \times z1/(z1+z2)) + Te22 \quad \text{Expression 4}$$

Then, expression 4 above is modified, and the following equation 5 is derived.

$$Te22 = Te21 + (Te1 - Te2) \times z1/(z1+z2) \quad \text{Expression 5}$$

Here, as described in the above-mentioned explanation of FIG. 4, during the execution of the idle processing, the generated torque of the internal combustion engine 1 becomes a forward torque. In addition, the internal combustion engine 1 actually continue to generate the forward torque for a certain period of time, even after the ECU 11 starts the execution of the fuel stop processing in order to terminate the idle processing. For that reason, the generated torque of the internal combustion engine 1 after the lapse of the predetermined period of time Δt from the end of the execution of the idle processing shown in the above-mentioned FIG. 3 (in other words, at the time point t3 in the above-mentioned FIG. 3) becomes a forward torque. On the other hand, as described in the above-mentioned explanation of FIG. 6, during the execution of the motoring processing, the generated torque of the internal combustion engine 1 becomes a counter torque. Thus, the generated torque of the internal combustion engine 1 after the lapse of the predetermined period of time Δt from the end of the execution of the motoring processing shown in FIG. 8 (in other words, at the time point t3 in FIG. 8) becomes a counter torque.

Accordingly, when the forward torque is represented as a positive value and the counter torque is represented as a negative value, Te1 becomes a positive value and Te2 becomes a negative value. In that case, (Te1−Te2) in the above-mentioned expression 5 becomes a positive value. In addition, Te21 and Te22 are both negative values. Thus, the following equation 6 will be derived based on the above-mentioned expression 5.

$$|Te22| < |Te21| \quad \text{Expression 6}$$

In other words, Te22 becomes a counter torque smaller than Te21, as represented by the above-mentioned expression 6.

Here, in the control shown in FIG. 8, the rotation speed of the internal combustion engine 1 at the time point t2 at which the execution of the forced stop processing is started becomes Ne2 which is the same as the rotation speed of the internal combustion engine 1 at the time point t2 shown in the above-mentioned FIG. 3. For that reason, in the control shown in FIG. 8, similar to the above-mentioned control shown in FIG. 3, the MG1 torque becomes the predetermined torque Te3 after the time point t3, accompanying the execution of the forced stop processing. Moreover, when Te22 is decided based on the above-mentioned expression 5, the reduction rate of the rotation speed of the internal combustion engine 1 after the time point t2 in FIG. 8 becomes substantially the same as the reduction rate of the rotation speed of the internal combustion engine 1 after the time point t2 shown in the above-mentioned FIG. 3. As a result, as shown in FIG. 8, a period of time until the rotation speed of the internal combustion engine 1 drops from Ne2 to Ne3 becomes the same as the period of time Δt1 shown in the above-mentioned FIG. 3. According to this, situation where the change in the rotation speed of the internal combustion engine 1 accompanying the forced stop processing becomes rapid is suppressed, and hence, it is possible to suppress the generation of noise and vibration accompanying the stop of the rotation of the internal combustion engine as much as possible.

Here, note that when the friction of the internal combustion engine 1 changes, the value of the generated torque Te1 of the internal combustion engine 1 1 in the above-mentioned expression 5 changes. Accordingly, the ECU 11 may calculate Te22 by estimating the friction of the internal combustion engine 1 at the time of start of the execution of the forced stop processing. Alternatively, the ECU 11 may calculate Te22 by using a predetermined friction value of the internal combustion engine 1.

In addition, the internal combustion engine according to this embodiment may be further provided with a downstream side exhaust gas purification catalyst in the exhaust passage 4 at the downstream side of the catalyst casing 40. When the exhaust gas purification catalyst (i.e., an upstream side exhaust gas purification catalyst) received in the catalyst casing 40 is exposed to an atmosphere of excessive oxygen by the execution of the poisoning elimination processing (the motoring processing), the purification performance of the upstream side exhaust gas purification catalyst is made as high as possible by the elimination of the poisoning of the upstream side exhaust gas purification catalyst, at the time of restart of the internal combustion engine 1. However, there is also a fear that a decrease in the NOx removal or reduction rate may occur, resulting from this atmosphere of excessive oxygen in the upstream side exhaust gas purification catalyst at the time of restart of the internal combustion engine 1. Accordingly, provision is made for the downstream side exhaust gas purification catalyst as mentioned above. As a result of this, even if NOx, which has not been reduced by the upstream side exhaust gas purification catalyst, flows out from the catalyst casing into the exhaust passage 4 at the downstream side thereof at the time of restart of the internal combustion engine 1, the NOx can be reduced by the downstream side exhaust gas purification catalyst. Accordingly, the deterioration of emissions at the time of restart of the internal combustion engine 1 can be suppressed.

Modification of the First Embodiment

Next, reference will be made to a modification of the above-mentioned first embodiment. Here, note that in this modification, the detailed explanation of substantially the same construction and substantially the same control processing as in the first embodiment will be omitted.

In the above-mentioned first embodiment, when the stop of the rotation of the internal combustion engine 1 is requested and the execution of the poisoning elimination processing is requested, the motoring processing is carried out as the poisoning elimination processing. In contrast to this, in this modification, when the stop of the rotation of the internal combustion engine 1 is requested and the scavenging of the poisoning elimination processing is requested, the motoring processing is carried out as scavenging processing. As mentioned above, during the execution of the motoring processing, a forward torque is inputted to the internal combustion engine 1 by means of the MG1, and at the same time, the fuel injection from the fuel injection valves 2 is stopped, and the throttle valve is opened. For that reason, when the motoring processing is carried out, intake air in the intake passage 3 flows through the cylinders and the exhaust passage 4 of the internal combustion engine 1 as it is, whereby the cylinders and the exhaust passage 4 of the internal combustion engine 1 will be scavenged.

Here, a control procedure in this modification will be explained with reference to the above-mentioned FIG. 7. In this modification, if an affirmative determination is made in step S101, subsequently in step S102, it is determined whether a scavenging processing request flag flagscrq, in place of the above-mentioned poisoning elimination processing request flag flagcarq in FIG. 7, is set ON. Here, note that the scavenging processing request flag flagscrq is a flag which is set by a well-known flow or routine different from this flow or routine. Then, if an affirmative determination is made in step S102, the routine of the ECU 11 goes to the processing of step S103, whereas if a negative determination is made in step S102, the routine of the ECU 11 goes to the processing of step S108.

It addition, after the processing of S105, it is determined in step S106 whether the scavenging processing request flag flagscrq, in place of the above-mentioned poisoning elimination processing request flag flagcarq in FIG. 7, has become OFF. Then, if an affirmative determination is made in step S106, the routine of the ECU goes to the processing of step S107, whereas if a negative determination is made in step S106, the routine of the ECU 11 returns to the processing of step S105.

Then, when the motoring processing is carried out as the scavenging processing, too, in the subsequent forced stop processing, the counter torque adjustment processing is carried out together with the forced stop processing, whereby the generation of noise and vibration accompanying the stop of the rotation of the internal combustion engine 1 can be suppressed as much as possible.

Second Embodiment

Figure 9:
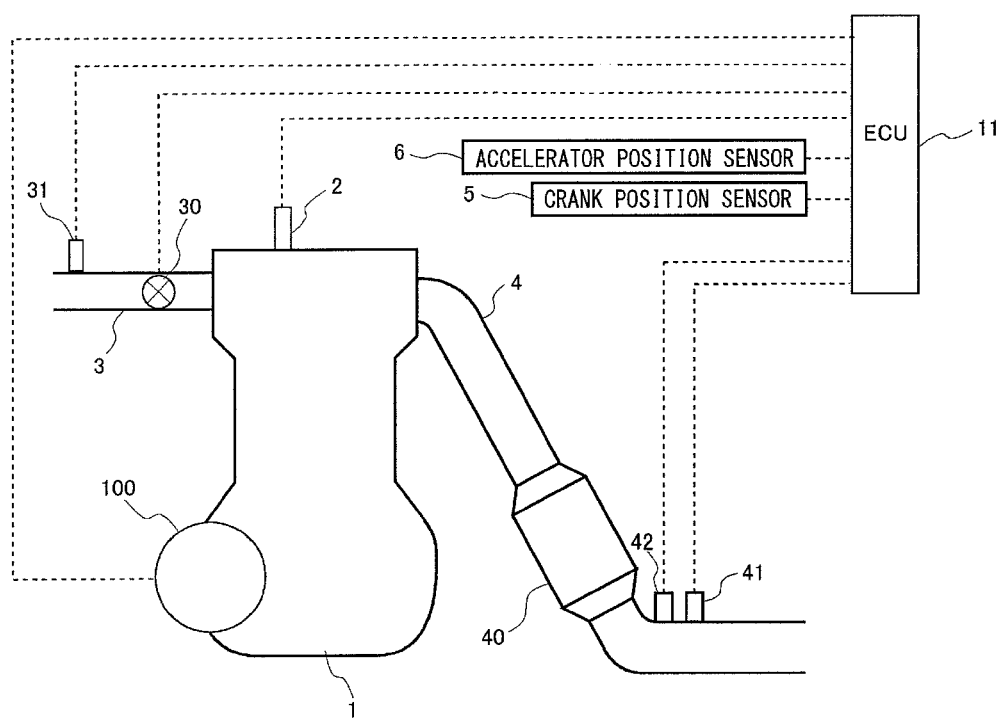
FIG. 9 is a view showing the schematic construction of an internal combustion engine according to a second embodiment of the present disclosure.

Now, reference will be made to a second embodiment of the present disclosure. In this second embodiment, the present disclosure is applied to a vehicle which is provided with an internal combustion engine 1. FIG. 9 is a view showing the schematic construction of the internal combustion engine 1 according to this second embodiment. Here, note that in this second embodiment, the detailed explanation of substantially the same construction and substantially the same control processing as in the first embodiment will be omitted.

The internal combustion engine 1 according to this embodiment is provided with a starter motor 100, as shown in FIG. 9. The starter motor 100 is a motor for driving an unillustrated crankshaft to rotate, and is constructed so that a forward torque and a counter torque can be selectively inputted to the internal combustion engine 1. Then, the starter motor 100 is electrically connected to the ECU 11, so that the ECU 11 can selectively input the forward torque and the counter torque to the internal combustion engine 1 and at the same time can control the magnitudes of the forward and counter torques, by using the starter motor 100.

In such an internal combustion engine 1, idling stop processing may be carried out during the stop of the vehicle based on a well-known technique. In this idling stop processing, when a well-known execution condition is satisfied during the stop of the vehicle, the rotation of the crankshaft of the internal combustion engine 1 is automatically stopped by the ECU 11. At this time, the ECU can carry out forced stop processing which forcibly reduces the rotation speed of the internal combustion engine 1, by inputting a counter torque to the internal combustion engine 1 by using the starter motor 100.

In addition, when the stop of the rotation of the internal combustion engine 1 is requested and the execution of poisoning elimination processing or scavenging processing is requested, the ECU 11 can carry out the motoring processing which inputs a forward torque to the internal combustion engine 1 by using the starter motor 100, in a state where fuel injection in the internal combustion engine 1 is stopped.

Then, in the case of carrying out the forced stop processing after the completion of the execution of the motoring processing, the ECU 11 carries out counter torque adjustment processing together with the forced stop processing. This can suppress the generation of noise and vibration accompanying the stop of the rotation of the internal combustion engine 1 as much as possible.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control system for an internal combustion engine comprising a controller comprising at least one processor configured to:

selectively input a torque in the direction of rotation of the internal combustion engine and a torque in the direction of reverse rotation thereof to the internal combustion engine by means of a driving force of a motor, and control a magnitude of each torque, the controller being adapted to stop the rotation of said internal combustion engine by carrying out forced stop processing in which a counter torque, which is the torque in the reverse direction with respect to the direction of rotation of said internal combustion engine, is inputted to said internal combustion engine;

wherein the controller makes said counter torque smaller at a certain timing before said counter torque becomes a predetermined torque after the start of the execution of said forced stop processing, in the case where said forced stop processing is carried out after the completion of the execution of specific motoring processing in which the torque in the direction of rotation of said internal combustion engine is inputted to said internal combustion engine in a state where fuel injection in said internal combustion engine is stopped, as compared to the counter torque in the case where said forced stop processing is carried out without carrying out said specific motoring processing.

2. The control system for an internal combustion engine according to claim 1, wherein said controller is further configured to determine whether the execution of poisoning elimination processing with respect to an exhaust gas purification catalyst, which is a three-way catalyst arranged in an exhaust passage of said internal combustion engine, is requested;
wherein the controller carries out said specific motoring processing, when the stop of the rotation of said internal combustion engine is requested and the execution of said poisoning elimination processing is requested.

3. The control system for an internal combustion engine according to claim 1, wherein
in the case where said forced stop processing is carried out after the completion of the execution of said specific motoring processing, said controller controls said counter torque in such a manner that a reduction rate of an engine rotation speed of said internal combustion engine after the start of the execution of said forced stop processing becomes substantially the same as the reduction rate in the case where said forced stop processing is carried out without performing said specific motoring processing.

4. The control system for an internal combustion engine according to claim 2, wherein
in the case where said forced stop processing is carried out after the completion of the execution of said specific motoring processing, said controller controls said counter torque in such a manner that a reduction rate of an engine rotation speed of said internal combustion engine after the start of the execution of said forced stop processing becomes substantially the same as the reduction rate in the case where said forced stop processing is carried out without performing said specific motoring processing.

* * * * *